United States Patent [19]
Forni

[11] 3,860,038
[45] Jan. 14, 1975

[54] TEST COUPLING

[75] Inventor: Joseph M Forni, Scottsdale, Ariz.

[73] Assignee: Gerald V. Burton, Phoenix, Ariz. ; a part interest

[22] Filed: Jan. 8, 1973

[21] Appl. No.: 322,027

[52] U.S. Cl.................. 138/94.3, 251/167, 285/236
[51] Int. Cl............................................. F16l 55/10
[58] Field of Search ............. 138/94.3, 94, 44, 100, 138/42; 277/DIG. 10; 285/242, 248, 252, 235, 236, 419; 251/167

[56] References Cited
UNITED STATES PATENTS

| | | | |
|---|---|---|---|
| 872,366 | 12/1907 | Ver Planck.................. | 277/DIG. 10 |
| 1,242,060 | 11/1917 | Smakal.................................. | 138/99 |
| 1,838,656 | 12/1931 | Bullock.............................. | 138/94.3 |
| 2,271,138 | 1/1942 | Hamer.............................. | 138/94.3 |
| 2,271,282 | 1/1942 | Young.............................. | 138/94.3 |
| 3,051,201 | 8/1962 | Wilson.............................. | 138/94.3 |
| 3,105,570 | 10/1963 | Bezemes.......................... | 138/42 X |
| 3,359,351 | 12/1967 | Bender............................ | 138/149 X |
| 3,430,989 | 3/1969 | Wendt........................... | 285/235 X |

FOREIGN PATENTS OR APPLICATIONS

| | | | |
|---|---|---|---|
| 265,155 | 5/1962 | Australia..................... | 277/DIG. 10 |

*Primary Examiner*—Richard C. Queisser
*Assistant Examiner*—Daniel M. Yasich
*Attorney, Agent, or Firm*—Cahill, Sutton & Thomas

[57] ABSTRACT

A pipe coupling device for connecting the open ends of two axially aligned fluid conduits and including a removable disc that blocks the flow of liquid through the coupling. A cylindrical sleeve surrounds and seals against the ends of the open conduits to be connected. A slot is provided in the sleeve and is positioned to permit a disc to be inserted in the coupling in a plane transverse to the fluid conduits. The disc may be removed and the slot subsequently sealed to provide uninterrupted fluid flow through the coupling.

6 Claims, 7 Drawing Figures

PATENTED JAN 14 1975 3,860,038

TEST COUPLING

The present invention pertains to fluid couplings, and more particularly, to a coupling for use in systems wherein pressure tests are required.

Present construction techniques frequently require that waste, drain and vent lines be tested upon completion of the installation by subjecting the system to a predetermined head of water. The test is usually carried out by closing the waste drain or vent line at a strategic location and then subject the system to the designated water pressure; present plumbing practices usually provide a means for conveniently testing the system by the insertion of a test fitting that can be used to block the lines in a critical location for testing purposes followed by a removal of the blockage.

Typical test fittings take the form of a tee with the straight portion of the tee connected to the ends of axially aligned pipes. The right angle portion of the tee is utilized for the insertion of the ball or plug that can be used to block the flow of liquid through the tee. The typical configuration of such a ball is a balloon-type inflatable bladder that is inserted in the tee and subsequently pumped up with air to a pressure sufficient to cause the inflated ball to seal against the interior walls of the tee and provide a liquid blockage at the point of the tee. Unfortunately, such inflated balls or plugs are difficult to remove and sometimes require completed instrumentation for complete removal of the ball after the test has been completed. The tee that has been inserted to provide the test function, as is described above, is frequently a relatively expensive item which presents an incentive for its removal upon completion of the test; however, such removal of the tee, in fact, is an alteration of the system which is therefore in violation of many of the codes relating to such drain, waste and vent systems. Further, repeated usage of the inflated ball or plug and its necessary accounterments results in rapid deterioration, frequently causing failure with the concomitant necessity for replacement of the expensive test equipment. Obviously, the plug or ball must be suited in size to the system for which it is used and a variety of sizes therefore must be on hand.

The expense of the tees and the corresponding test equipment is frequently not the most undesirable part of the prior art test coupling; rather, the labor required to fit the tee and insert the ball followed by the necessary steps to inflate the ball and attempt to move it result in substantial costs to the installation of the overall system.

It is therefore an object of the present invention to provide a test coupling that is inexpensive and is easily installed.

It is another object of the present invention to provide a test coupling wherein a blockage in a drain, waste or vent system may be inserted to test the system without requiring special tools or implements.

It is still another object of the present invention to provide a test coupling that is rugged and dependable and may be inserted in an appropriate location in a system and subsequently left in the system at a minimum cost.

These and other objects of the present invention will become apparent to those skilled in the art as the description thereof proceeds.

The present invention may be described by reference to the accompanying drawings, in which.

Figure 1:
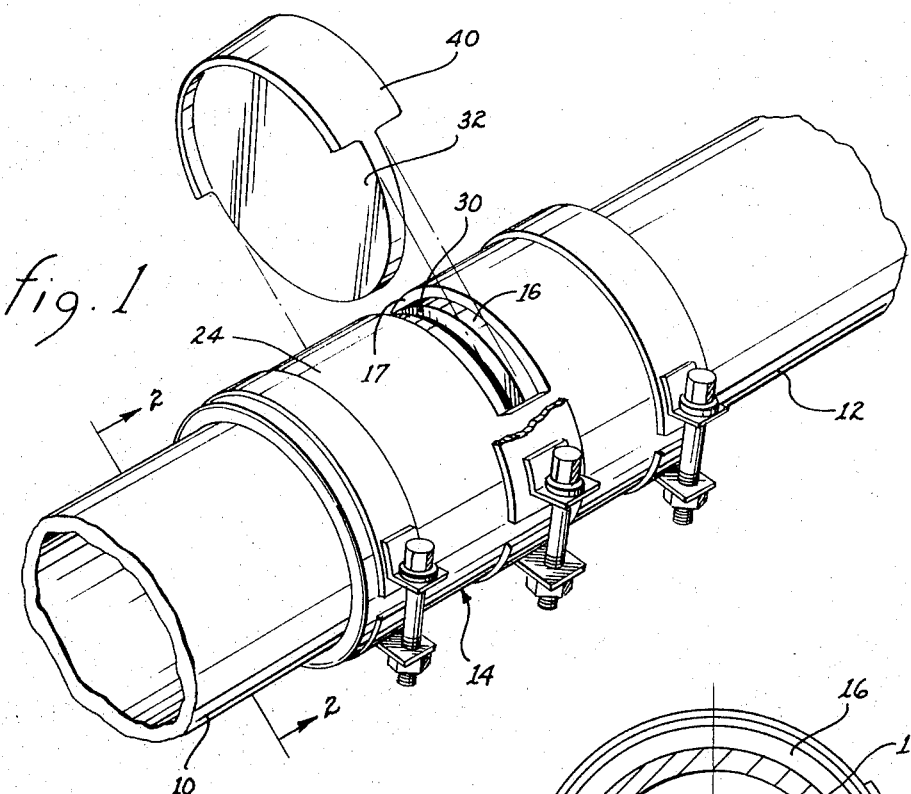
FIG. 1 is a perspective view, partially exploded and partially in section, of a test coupling constructed in accordance with the teachings of the present invention.
Figure 2:
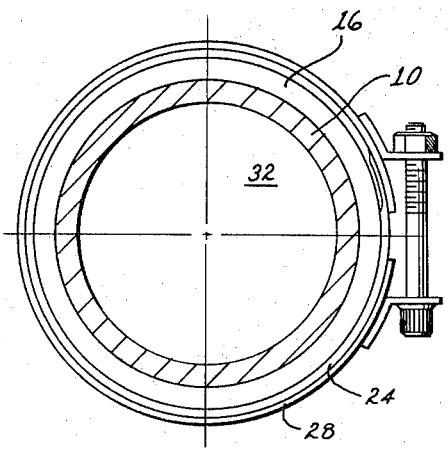
FIG. 2 is a cross-sectional view of FIG. 1, taken along line 2—2.
Figure 3:
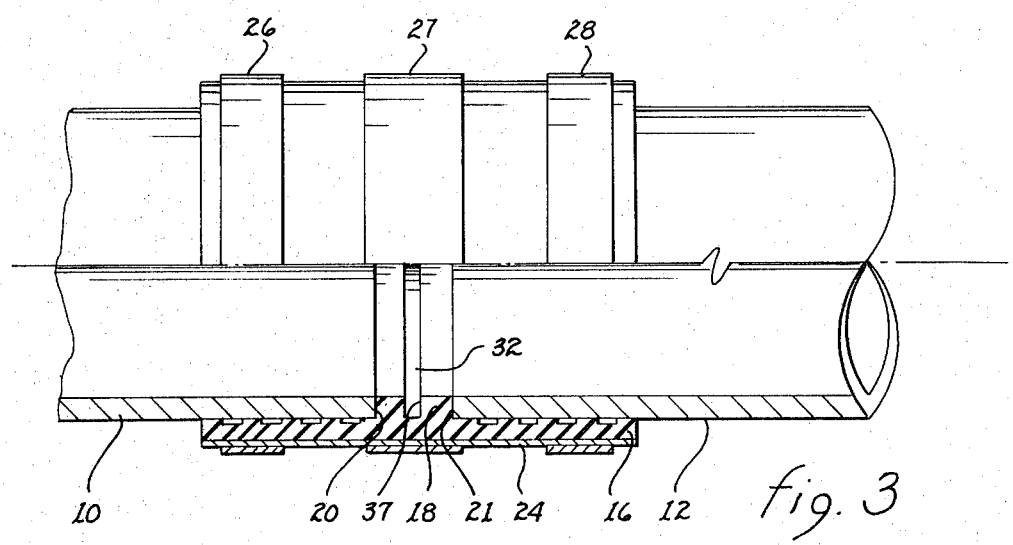
FIG. 3 is a side elevational view, partly in section, of the test coupling of FIG. 1.

Referring now to FIGS. 1, 2 and 3, it may be seen that pipes, such as drain pipes 10 and 12 are axially aligned and may be coupled with the coupling shown generally at 14. The coupling comprises a cylindrical sleeve 16 of rubber or other suitable resilient material; the sleeve 16 is co-axial with and surrounds the ends of the pipes 10 and 12. The sleeve 16 includes an internal circumferential rib 18 to provide an abutting surface for the ends 20 and 21 of the pipes 10 and 12 respectively.

The coupling 14 includes a sheath 24 of stainless steel or other similar material wrapped about the exterior of the sleeve 16. Clamps 26, 27, and 28 circumferentially engage the sheath 24 and provide a means for clamping the sleeve 16 into sealing engagement with the pipes 10 and 12. The sleeve 16 includes an arcuate slot 30 extending therethrough in a plane transverse of the pipes 10 and 12. The sheath 24 of the sleeve 16 includes an opening 17 therein to permit access to the slot 30. The slot 30 is positioned between the ends 20 and 21 of the pipes 10 and 12. A disc member 32 is removably mounted in the slot 30 and is seated in an internal circumferential channel 37 provided in the internal circumferential rib 18. The disc 32 includes a flange 40 positioned about the periphery of the disc 32. The flange 40 engages the resilient material of the sleeve 16 when the disc 32 is seated in the channel 37. The contact between the flange 40 and the resilient material of the sleeve 16 is a sealing engagement when the flange 40 is subjected to the clamping forces of the clamp 27.

It may be seen that the test coupling described in connection with FIGS. 1, 2, and 3 may be placed in any predetermined location in the piping system to provide a means for blocking liquid flow for head pressure testing. The coupling is mounted in the manner shown between opposing axially aligned ends of pipes 10 and 12. The clamps 26, 27, and 28 insure sealing engagement of the resilient material of the sleeve 16 with the pipes while the clamp 27 seals the flange 40 against the resilient material of the sleeve 16. With the disc 32 thus in place in the channel 37, liquid flow past the coupling is prevented. When the test has been completed, the clamp 27 is removed and the disc 32 is withdrawn from the slot 30. The exposed slot 30 may then be sealed such as by the use of the clamp shown in FIGS. 6 and 7.

Figure 6:
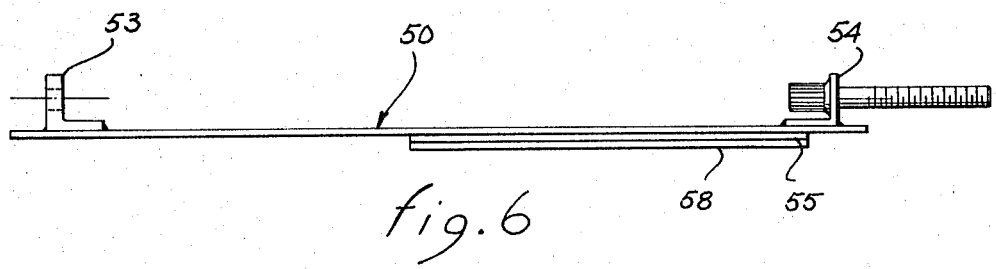
FIGS. 6 and 7 are side elevation and plan views respectively of a clamp means suitable for use in the system of the present invention.
Figure 7:
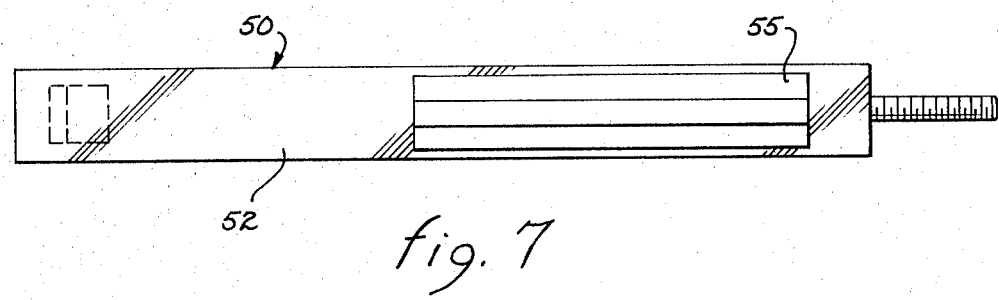

Referring to FIGS. 6 and 7, the clamp 50 comprises a strap 52 of stainless steel or other suitable material to which tabs 53 and 54 have been secured in any well known manner. A resilient pad or seal 55 is cemented or otherwise secured to the strap 52; the seal 55 fits in the opening 17 of the sheath 24 and contacts the sleeve 16. A second resilient pad or seal 58 may be bonded to the first seal 55; the seal 58 is of an appropriate dimension to slightly extended into and sealingly engage the slot 30.

The disc 32 may be formed of a variety of materials such as plastic or the like. The slot 30 may be resealed after removal of the disc 32 and after the above-described test without using the clamp 50 and instead reusing the clamp 27. Resealing in this manner may be possible by rendering the flange 40 removable from the disc 32. The removability of the flange 40 may readily be provided (particularly if the disc and flange are made of plastic) by forming what is known in the trade as a break-away joint between the two or a semi-perforated joint between the two. In this manner, the disc 32 may easily and manually be broken away from the flange 40, and the flange 40 replaced in its previous location after completion of the pressure test. The flange 40 may be The clamp 27 is then replaced and an effective seal formed between the flange 40 and the resilient material of the sleeve 16.

Figure 4:
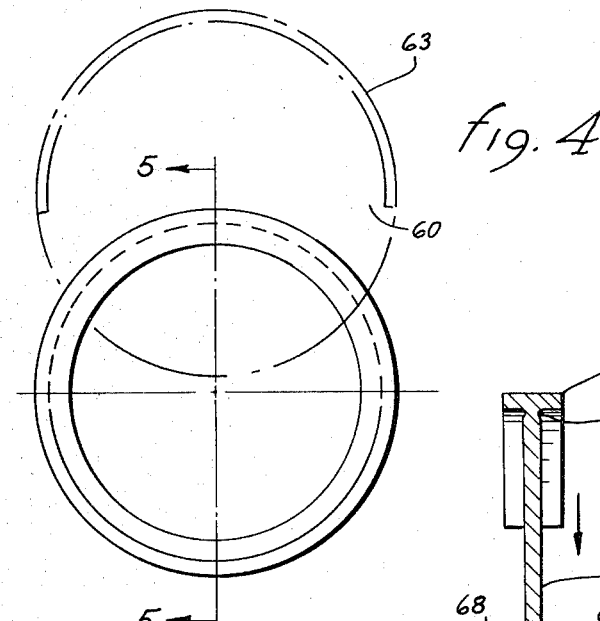
FIG. 4 is a schematic illustration of a portion of a test coupling constructed in accordance with the teachings of the present invention.
Figure 5:
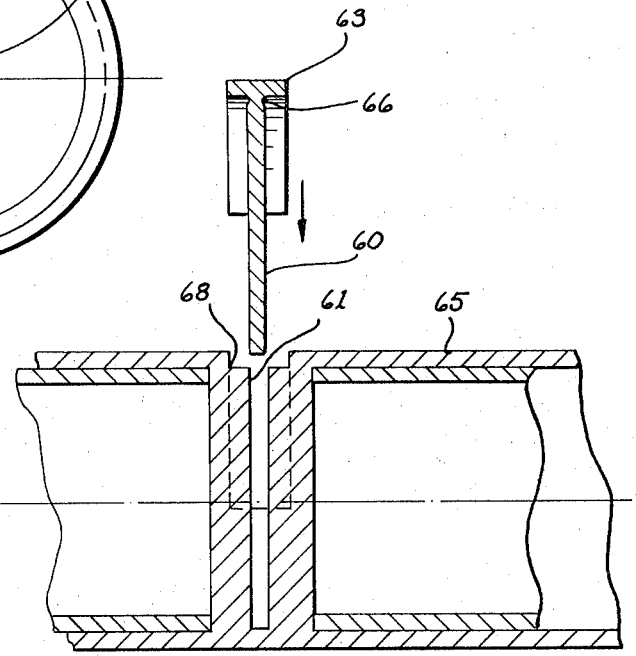
FIG. 5 is a cross-sectional view of FIG. 4, taken along line 5—5.

The above embodiments was described in terms of a disposable disc and a reusable flange or, alternatively, a sealing clamp to cover the slot exposed when the disc is removed. Referring now to FIGS. 4 and 5, another embodiment of the present invention is shown for use when the coupling 67 is made from resilient materials. The disc 60 is shown to be slightly tapered so as to form a sealing engagement with the corresponding slot 61 provided in the coupling 65. The disc 60 is provided with a flange 63 in a manner similar to that described previously; further, it may be noted that the juncture of the flange 63 and the disc 60 as shown at 66 is slightly indented to provide a weakened area and to thus permit the flange 63 to be removed from the disc 60 after the test has been completed. The disc 60 is thus seated in the slot 61 while the flange 63 engages a seat 68 provided therefor. It may be noted that the flange 63 extends over the circumference of the disc 60 for a distance slightly in excess of 180° as shown in FIG. 4 to facilitate easy removal of the disc after the test and to also provide a self-clamping action of the flange when it is placed on its seat 68 (the flange thus becomes the clamp). It may be noted that the flange 63 may be removed from the disc 60 and replaced on its seat 68 at the completion of the test; however, other sealing means must then be used (not shown) and may take the form of sealing compounds well known in the industry. Alternatively, the post-test sealing may be provided by the use of a clamp such as that shown in FIGS. 6 and 7. The disc 60 and flange 63 of the embodiment in FIGS. 4 and 5 may be reused when clamps, such as those shown in FIGS. 6 and 7, are used. This latter embodiment is particularly adaptable for use with couplings of plastic, copper or other similar non-resilient materials.

The test coupling of the present invention may conveniently and quickly be connected into the system at a desired point; the test may be completed in an expeditious manner with the disc in the coupling as described above. Upon completion of the test, the disc can be removed and the slot provided therefor resealed in the manner such as that described without the utilization of special tools or equipment and in a minimum of time and difficulty.

I claim:

1. A test coupling for joining the ends of two cylindrical fluid conduits to facilitate testing of the fluid system of which the conduits are a part, comprising: a resilient cylindrical sleeve member for sealingly engaging said ends of said conduits to provide a continuous fluid channel through said conduits and sleeve member; means defining an arcuate slot extending through a portion of said resilient cylindrical sleeve member; said slot positioned in a plane transverse of said conduits and intermediate the ends of said resilient cylindrical sleeve member; a disc member removably mounted in said resilient cylindrical sleeve member and extending into said slot, said disc blocking the flow of liquid through said resilient cylindrical sleeve member; said disc including an arcuate flange on the periphery of said disc, said arcuate flange abutting the exterior of said resilient cylindrical sleeve member and maintained in sealing engagement therewith when said disc member extends into said slot; and clamp means for clamping said disc in place in said resilient cylindrical sleeve.

2. The combination set forth in claim 1, wherein said resilient cylindrical sleeve member is co-axial with said conduits and surrounds the ends of said conduits, and wherein said clamp means includes clamps surrounding the cylindrical sleeve to force, and maintain the sleeve into sealing engagement with said conduit ends.

3. The combination set forth in claim 1, wherein the cylindrical sleeve member is a substantially non-resilient material, such as copper, and wherein said clamp means includes a strap extending about the periphery of said cylindrical sleeve and overlying said flange.

4. The combination set forth in claim 1, wherein said flange is a breakaway flange and is removable from said disc for replacement over said slot when said disc is removed.

5. The combination set forth in claim 1, including sealing means coacting with the clamp means for sealing said slot when said disc is removed therefrom.

6. The combination set forth in claim 1, wherein said cylindrical sleeve member is formed of a substantially non-resilient material, such as copper, and said clamp means includes said flange which is a breakaway element cooperating with said disc.

* * * * *